March 18, 1969 C. B. GIBSON, JR 3,433,994

CAMERA TUBE APPARATUS

Filed June 14, 1966

CHARLES B. GIBSON JR.
INVENTOR
BY
BUCKHORN, BLORE, KLARQUIST & SPARKMAN
ATTORNEYS

United States Patent Office 3,433,994
Patented Mar. 18, 1969

3,433,994
CAMERA TUBE APPARATUS

Charles B. Gibson, Jr., Beaverton, Oreg., assignor to Tektronix Inc., Beaverton, Oreg., a corporation of Oregon Filed June 14, 1966, Ser. No. 557,586
U.S. Cl. 315—10 11 Claims
Int. Cl. H01j 31/28

ABSTRACT OF THE DISCLOSURE

A camera tube is constructed with a target formed of a plurality of semiconductor target elements toward which a relatively high velocity electron beam is directed. The target elements comprise separate P-N junctions which receive light images thereon, converting the same into a plurality of potentials through photovoltaic action. The electron beam has a velocity such that secondary electrons are produced where the electron beam strikes the target, such secondary emission being in accordance with the voltage distribution across the semiconductor target elements.

Figure 1:
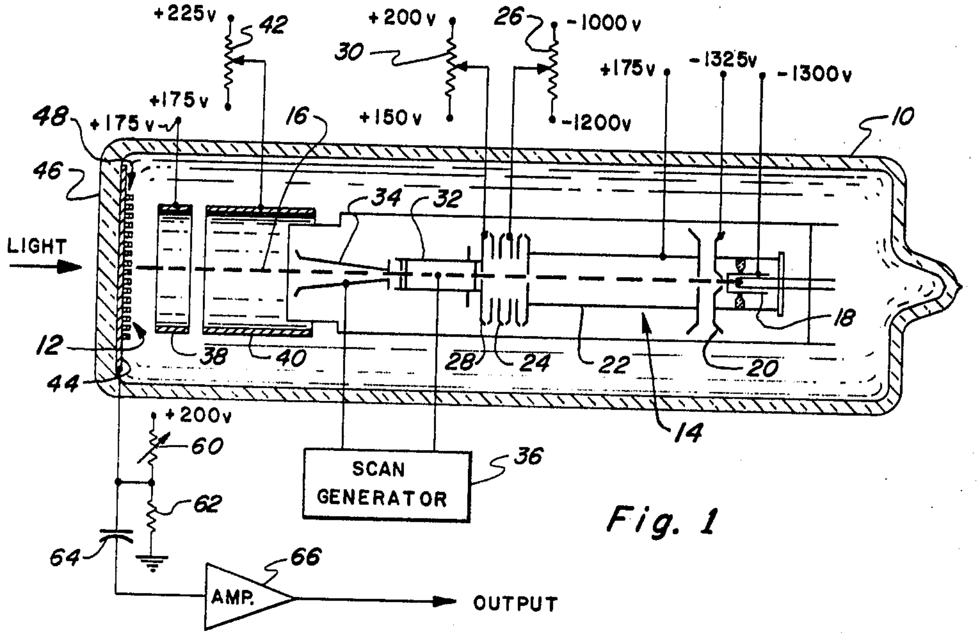

This invention relates to a camera tube apparatus and particularly to a camera tube apparatus of economical construction providing a substantial output signal the value of which is largely independent of the scanning rate of the apparatus.

Many television type camera tubes as heretofore employed, utilize a slow or decelerated electron beam for scanning or interrogating the camera tube target upon which the incoming light image is focused. For example, in the conventional vidicon, the scanning electron beam is decelerated after passing through a mesh located just in front of a target. Conventional vidicons are plagued with mechanical vibrations in their mesh and moreover, a "blow-up" problem occurs inasmuch as the electron beam tends to become somewhat larger as it is decelerated with a resulting loss in signal definition.

The camera tube apparatus according to the present invention avoids the aforementioned problems inasmuch as the scanning electron beam is not decelerated, but the electrons are directed at the target with approximately the same energy they had when passing an electrostatic deflection apparatus. The apparatus according to the present invention also operates at voltages where the secondary emission yield of the target can be greater than one. That is, the present tube operates in a secondary emission mode and this can further provide an advantage of current multiplication for developing a greater output signal.

The camera tube apparatus according to the present invention includes an advantageously constructed target formed of a plurality of semiconductor target elements toward which the relatively high velocity electron beam is directed. These target elements comprise separate P-N junctions which receive light imaged thereon, converting the same into a plurality of potentials through photovoltaic action. The electric fields in the tube are suitably arranged such that substantially no secondary emission collection takes place with respect to a target element which is not illuminated. However, when a target element is illuminated, it produces a voltage in substantial proportion to such illumination, and secondary emission collection takes place from such element in substantial proportion to the illumination of the target element.

The foregoing construction leads to several important advantages. The semiconductor target elements exhibit substantially negligible lag in response to changes in the light image and are capable of producing an immediate change in output signal. The target elements are essentially D.C. devices and no charging or integration time is required for them to assume their voltage. Either a slow or fast scanning rate may be employed without substantially changing the output signal resulting from target illumination. Since the output signal of the present camera tube apparatus is substantially independent of scanning rate, the camera tube apparatus is adaptable to a wide variety of uses. For example, a slow scan rate may be employed when it is desired to transmit a picture signal over a low bandwidth transmission system without using an intermediate buffer means. The present target therefore cooperates with the non-decelerated electron beam to provide improved results as compared with previously proposed tubes wherein the beam is either decelerated or not.

It is accordingly an object of the present invention to provide an improved camera tube apparatus of economical construction wherein the output signal is independent of scanning rate or the rate at which output information is produced.

It is another object of the present invention to provide an improved camera tube apparatus wherein the scanning rate or the rate at which output information is produced may be either rapid or quite slow as desired.

It is another object of the present invention to provide an improved camera tube apparatus of economical construction providing a substantial output voltage without problems relating to beam "blow-up" and mesh vibration.

Figures 2, 3, 4:
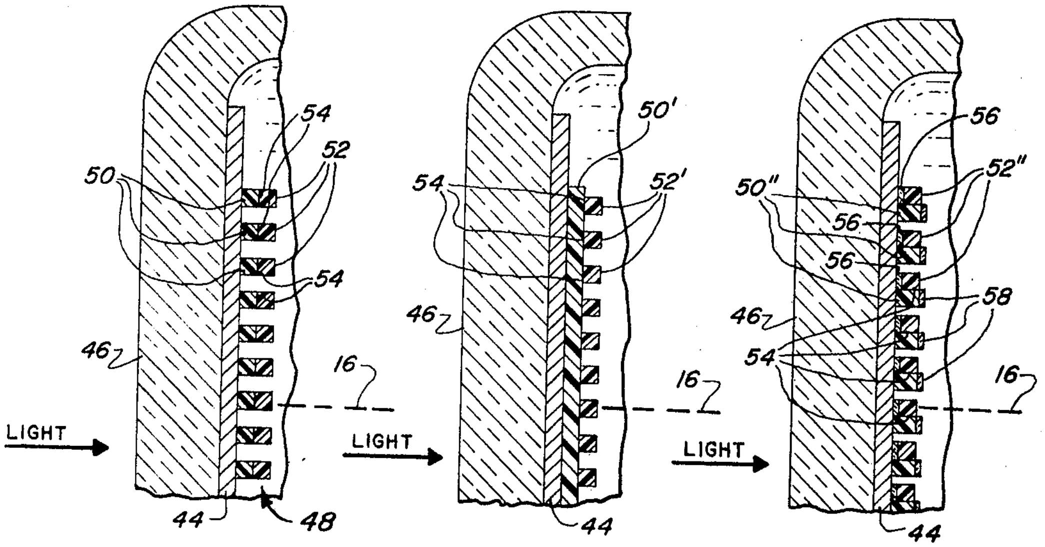

The present invention, both as to organization and method, and further emphasizing numerous additional objects and advantages thereof, may best be understood by reference to the following description taken in connection with accompanying drawings wherein like reference characters refer to like elements and in which:

FIG. 1 is a schematic representation of a camera tube apparatus in accordance with the present invention, FIG. 2 is a cross-section of a first target construction employed with the FIG. 1 apparatus, FIG. 3 is a cross-section of a second target construction employed with the FIG. 1 apparatus, and FIG. 4 is a cross-section of a third target construction employed with the FIG. 1 apparatus.

Referring to FIG. 1, a camera tube apparatus according to the present invention includes an elongated cylindrical envelope 10 formed of insulating material, preferably glass, housing a target 12 disposed at one end thereof and electron beam producing means 14 for directing an electron beam 16 toward the target 12. The electron beam producing means 14 includes an electron gun having an indirectly heated cathode 18 which may be connected to a negative D.C. voltage source of minus 1300 volts, and a control grid electrode 20. Control grid electrode 20 is appropriately connected to a minus 1325 volts. The electron beam producing means also suitably includes a first anode 22 connected to positive 175 volts, and a focus electrode 24 connected to the movable arm of a potentiometer 26 the opposite end terminals of which are connected to minus 1000 volts and minus 1200 volts respectively. A second anode 28 is connected to the movable arm of a potentiometer 30 the end terminals of which are connected to a plus 200 volts and plus 150 volts respectively.

A pair of horizontal deflection plates 32 and a pair of vertical deflection plates 34 are mounted within the envelope 10 between the electron beam producing means 14 and the target 12 for the purpose of deflecting or scanning electron beam 16 across the surface of target 12. Horizontal deflection plates 32 and vertical deflection plates 34 are appropriately energized from a scan generator 36 applying deflection voltages to these deflection plates such that electron beam 16 executes a suitable raster scan.

A collector electrode 38 in the form of a hollow metal cylindrical member or coating on the inner surface of the envelope 10 is positioned immediately adjacent the target 12 near the periphery thereof and is connected to a plus 175 volts, this being approximately the same voltage as applied to the target as hereinafter described. The numerical values of voltage are, of course, illustrative only. In any case, the target and collector electrodes are made sufficiently positive with respect to the voltage of the cathode 18 so that the secondary emission ratio for the target may be greater than unity whereby more than one secondary electron may be emitted for each primary electron bombarding the target from the electron beam. The secondary electrons emitted in this manner are suitably collected by collector electrode 38. A field corrector electrode 40 in the form of a hollow metal cylinder or wall coating may be provided between the collector electrode 38 and the vertical deflection plates 34 in order to provide a more uniform electrical field along the surface of the target. The field corrector electrode 40 is connected to a movable contact of a potentiometer 42 the end terminals of which are connected between a plus 225 volts and a plus 175 volts.

Target 12 includes a conduction means or backplate 44 deposited upon the glass faceplate 46 at the end of the tube. Backplate 44 is transparent whereby a light image may be easily transmitted therethrough, for example, backplate 44 is suitably a substantially transparent layer of tin oxide.

Upon backplate 44 is deposited a plurality of semiconductor target elements 48 each comprising a first semiconductor material and a second semiconductor material of the opposite conductivity type, forming a P-N junction therebetween. This target structure is more fully illustrated in FIG. 2. In the example illustrated in FIG. 2, a plurality of small bodies 50 of semiconductor material of a first conductivity type, e.g. P type, have deposited thereover bodies of semiconductor material of the opposite conductivity type, e.g. N type, illustrated at 52. These bodies are suitable square areas of silicon or germanium which have been appropriately doped to provide the desired type of conductivity. The bodies of semiconductor material are joined in a manner to provide P-N junction 54 therebetween. The semiconductor target elements are separated or spaced from one another on the face of the target so as to provide a plurality of distinct and separate P-N junctions 54. The separation between target elements illustrated in FIG. 2 is not necessarily to scale. These target elements may be more closely spaced if desired, while still maintaining the separation and insulation therebetween either by physical spacing, or by means of other insulating means. The FIG. 2 cross-section of the target may be considered as taken either in the vertical or horizontal direction. Thus the target elements may suitably have approximately the same horizontal and vertical dimension and are aligned whereby a plurality of such target elements are scanned by electron beam 16 in either orthogonal direction.

A variation of target structure is illustrated in FIG. 3 wherein the first semiconductor material 50' is common to each of the target elements and comprises a layer of P-type material deposited upon backplate 44. Then a plurality of separated bodies of the opposite conductivity type of semiconductor material, illustrated at 52', are deposited upon the material 50' in spaced relation to one another such that a plurality of separate semiconductor junctions 54 are formed therebetween.

A third variation of target structure in accordance with the present invention is illustrated in FIG. 4. In this embodiment, bodies 50" of a first conductivity type are deposited upon backplate 44 while a plurality of bodies of material of a second conductivity type, illustrated at 52", are also deposited on backplate 44 in conductive relation to bodies 50" in order to form P-N junctions therebetween. The material of bodies 50" is suitably of the P conductivity type and the material of bodies 52" is suitably of the N conductivity type. Bodies 52" are each joined to only one of the said bodies 50" and insulated or spaced from other such bodies 50" so that only one P-N junction is formed between any pair of such bodies. Bodies 52" are also each insulated from backplate 44 by insulating material 56, suitably comprising a layer of silicon dioxide at this point such that any conductive process between bodies 52" and backplate 44 takes place only through the P-N junction. Also, the bodies 50" of semiconductor material are insulated on the side thereof towards electron beam 16 as illustrated at 58 whereby the electron beam 16 may make electrical contact only with bodies 52". This insulation is also suitably silicon dioxide.

Returning to FIG. 1, the backplate 44 is connected to the midpoint of a voltage divider comprising resistors 60 and 62 disposed in series between a positive 200 volts and ground. The backplate 44 is suitably quiescently maintained by the voltage divider, e.g. at a positive 175 volts, or about the same potential as collector electrode 38 as hereinbefore mentioned, this being a suitable potential to enable secondary emission to take place from the target 12. This potential should be taken as approximate. For example, it may be desired to maintain backplate 44 at a quiescent voltage slightly higher than the voltage of collector electrode 38. For this purpose resistor 60 may be made adjustable. Alternatively, the voltage of collector electrode 38 may be made adjustable. Backplate 44 is also coupled through a capacitor 64 to the input of an amplifier 66. This amplifier provides an output for the camera tube indicative of the relative value of the potential and therefore illumination of the respective target elements.

The camera tube apparatus according to the present invention operates to provide a signal at the output of amplifier 66 indicative of the relative voltage across the target elements 48 sequentially scanned by electron beam 16 and therefore indicative of the light image which may be focused through glass faceplate 46 and transparent backplate 44 upon the target elements 48. Referring to FIG. 2, as such light image reaches the target elements 48, various of the elements will produce a voltage thereacross indicative of the light received.

Essentially no voltage will be produced across a target element which receives no light. Then body 52 of such an element will reside at approximately the same potential as backplate 44. However, when illumination strikes a target element, electron-hole pairs are generated substantially in proportion to the illumination. Certain of these current carriers diffuse across the P-N junction 54 of the target element illuminated producing a photovoltaic action. If body 50 of a particular target element is of P-type material and body 52 of the same target element is N-type material, a relatively negative voltage is produced at the scanned surface of body 52 relative to body 50 and therefore relative to backplate 44, and this voltage is substantially in proportion to the illumination received.

The field between collector electrode 38 and the target 12 is adjusted, e.g. by varying the value of resistor 60, such that when beam 16 scans a target element which is not illuminated, substantially no secondary emission to collector electrode 38 occurs, but when the electron beam scans a target element wherein body 52 assumes a voltage relative to backplate 44 due to illumination, secondary electrons will be produced in substantial proportion to such voltage and will have sufficient energy to reach the collector electrode 38. The secondary emission current to collector electrode 38 is then a measure of the illumination of the target element scanned. This current may be measured at the collector electrode or, as in the FIG. 1 embodiment, the secondary emission current change can also be measured at backplate 44 and amplified by means of amplifier 66 to produce a usable output. The change in current produces a change in voltage drop across resistors 60 and 62 resulting in an output voltage coupled through capacitor 64.

Each of the target elements thus form a photovoltaic cell or battery the output of which is dependent almost entirely upon the illumination of the target element. This output voltage of a target element is substantially D.C. and substantially independent of the scanning rate of the camera tube apparatus. No integration of charge is necessary at the target element during the time the electron beam is absent therefrom and this voltage changes substantially only with the change in illumination. Therefore, the electron beam 16 may be scanned at any convenient rate. For example, a very slow scan is possible and this slow scan does not deplete the target element voltage. Since a very slow scan is possible, the output of amplifier 66 can be coupled to a remote location over a transmission system having low bandwidth characteristics. The scan rate may even be slowed to zero and the illumination of a particular selected target element or elements may be selectively read out. There is also no lag in response of the present apparatus with changes in the light image being viewed. The voltage across the semiconductor target elements changes very rapidly in response to changes to illumination. Therefore, a rapid scan may also be employed and again the output is substantially independent of scan rate while maintaining an accurate and steady output signal representation of the image viewed.

The target elements are scanned by a relatively high velocity electron beam generated and accelerated the length of the camera tube apparatus. The electron beam need not be decelerated in the target region and therefore the camera tube apparatus of the present invention is simpler and more economical to produce than tubes requiring a deceleration mesh. Moreover, since the beam is not decelerated, beam "blow-up" inherent in camera tubes employing deceleration is avoided. Moreover, since the apparatus of the present invention is operated at voltages where the secondary emission yield of the target can be greater than one, advantage can be taken of the resultant current multiplication in developing a greater output signal.

Although an exposed N-type surface has been described in connection with a preferred embodiment of the present device, an exposed P-type surface could also be used, in which case electrons from non-illuminated areas would be collected and electrons from illuminated areas would not be collected. The output signal would then have the opposite sense. However, the configuration employing the exposed N-type surfaces is preferred since it appears to be more efficient resulting in less noise in the output.

It should be noted that the relative size of the target elements as illustrated herein is for explanation purposes only and these target elements may be smaller and more closely spaced, or they may be larger if desired, according to the degree of image definition required.

While I have shown and described a particular embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A camera tube apparatus comprising:

a camera tube target means exposed to radiation detected by said camera tube, said target means including a plurality of semiconductor means for producing a voltage by photovoltaic action in response to a radiation image directed towards said target and said semiconductor means, said target means providing a substantially instantaneous voltage distribution in response to said radiation image, electron beam means for scanning said voltage distribution on said semiconductor means with a beam of electrons in order to ascertain the voltage produced at said plurality of semiconductor means due to photovoltaic action, said electron beam having a velocity sufficient to produce secondary emission from said target means, the secondary emission ratio for said target means being greater than one at least for locations in said voltage distribution, and output means for determining the voltage produced at said plurality of semiconductor means in accordance with the secondary emission produced therefrom when said beam of electrons is directed thereupon.

2. The apparatus according to claim 1 including means for coupling a sufficiently high positive voltage to said target means for causing said secondary emission ratio to be greater than one.

3. A camera tube apparatus comprising:

a camera tube target exposed to radiation detected by said camera tube, said target including a plurality of separate semiconductor target element means each comprising a first semiconductor material and a second semiconductor material of the opposite conductivity type and a P-N junction therebetween for receiving radiation and producing a potential by photovoltaic action in response to said radiation, conduction means on said target electrically joining the first semiconductor material of the said target elements, and means for generating an electron beam for scanning the second semiconductor material of said target elements, said electron beam having sufficient velocity to produce secondary emission form said elements according to the potential produced thereacross with respect to said conduction means by said photovoltaic action.

4. The camera tube apparatus according to claim 3 further including electrostatic deflection means for providing scanning potentials with respect to said electron beam for causing said electron beam to scan over the surface of said camera tube target.

5. The camera tube apparatus according to claim 3 further including collector means disposed in the vicinity of said target around the periphery thereof on the scanned side of said target for collecting secondary emission selectively produced from elements of said target as said electron beam is directed thereat; said conduction means on said target and said collector means having a sufficiently high voltage applied thereto relative to said means for generating an electron beam for bringing about secondary emission at least from ones of said element means which reside at a slightly lower voltage than do other of said element means because of photovoltaic action.

6. The camera tube apparatus according to claim 3 wherein said P-N junctions for each of said target elements is separated and distinct from P-N junctions for each of the other said target elements.

7. The camera tube apparatus according to claim 3 wherein said target elements comprise separated bodies of a first semiconductor material mounted on said conduction means and wherein separated bodies of said second semiconductor material are supported on said bodies of first semiconductor material, said first semiconductor material separating said second semiconductor material from said conduction means while forming separate P-N junctions with said bodies of second semiconductor material.

8. The camera tube apparatus according to claim 3 wherein the said first semiconductor material as it relates to a plurality of target elements is continuous and comprises a single common layer of such semiconductor material, and wherein the second semiconductor material for each of said target elements comprises a body of such second semiconductor material separated from the second semiconductor material of each other target element while being supported on said first material to provide separate P-N junctions for each of said target elements.

9. The camera tube apparatus according to claim 3 wherein each of said target elements comprises first bodies semiconductor material joined to said conduction means and wherein bodies of second semiconductor material are similarly mounted on said first conduction means adjacent said first semiconductor material, but with insulating material separating said conduction means from said second semiconductor material.

10. The camera tube apparatus according to claim 9 wherein the said second semiconductor material for each of said target elements is exposed in the direction of said electron beam and further including insulating material covering said first semiconductor material of each of said target elements in the direction of said electron beam.

11. The camera tube apparatus according to claim 3 wherein said conduction means comprises a conducting transparent backplate through which radiation is directed upon said target elements, and further including output coupling means connected to said backplate for developing an output signal as secondary emission occurs from the said target elements.

References Cited

UNITED STATES PATENTS

| | | | |
|---|---|---|---|
| 3,011,089 | 11/1961 | Reynolds | 315—10 |
| 3,322,955 | 5/1967 | Desvignes | 250—211 X |

RODNEY D. BENNETT, *Primary Examiner.*

D. C. KAUFMAN, *Assistant Examiner.*

U.S. Cl. X.R.

313—65; 178—7.2; 250—211

UNITED STATES PATENT OFFICE

CERTIFICATE OF CORRECTION

Patent No. 3,433,994

March 18, 1969

Charles B. Gibson, Jr.

It is certified that error appears in the above identified patent and that said Letters Patent are hereby corrected as shown below:

Column 3, line 39, "suitable" should read -- suitably --. Column 6, line 26, after "target" insert -- for --; line 33, "form" should read -- from --.

Signed and sealed this 31st day of March 1970.

(SEAL)

Attest:

Edward M. Fletcher, Jr.

Attesting Officer

WILLIAM E. SCHUYLER, JR.

Commissioner of Patents